(12) United States Patent
Taniguchi et al.

(10) Patent No.: US 8,477,338 B2
(45) Date of Patent: Jul. 2, 2013

(54) PRINT JOB MANAGEMENT SYSTEM AND DEFAULT PRINTER DETERMINING APPARATUS

(75) Inventors: Shinya Taniguchi, Matsumoto (JP); Reiji Kobayashi, Matsumoto (JP); Koki Go, Shiojri (JP)

(73) Assignee: Seiko Epson Corporation, Tokyo (JP)

( * ) Notice: Subject to any disclaimer, the term of this patent is extended or adjusted under 35 U.S.C. 154(b) by 1232 days.

(21) Appl. No.: 12/034,987

(22) Filed: Feb. 21, 2008

(65) Prior Publication Data

US 2008/0204798 A1 Aug. 28, 2008

(30) Foreign Application Priority Data

Feb. 22, 2007 (JP) ................... 2007-042745

(51) Int. Cl.
*G06F 3/12* (2006.01)
(52) U.S. Cl.
USPC ........ 358/1.15; 358/1.14; 358/1.16; 715/744; 715/740
(58) Field of Classification Search
USPC ................ 358/1.15, 1.14, 1.16; 715/744, 740
See application file for complete search history.

(56) References Cited

U.S. PATENT DOCUMENTS

| | | | |
|---|---|---|---|
| 6,862,103 B1 | 3/2005 | Miura et al. | |
| 7,126,704 B2 | 10/2006 | Miura et al. | |
| 7,227,657 B1 * | 6/2007 | Haltmeyer | 358/1.15 |
| 7,359,076 B2 * | 4/2008 | Uchino | 358/1.15 |
| 2002/0145627 A1 * | 10/2002 | Whitmarsh et al. | 345/745 |
| 2002/0186410 A1 * | 12/2002 | Tanaka | 358/1.15 |
| 2004/0130744 A1 * | 7/2004 | Wu et al. | 358/1.15 |
| 2005/0024677 A1 | 2/2005 | Miura et al. | |
| 2006/0062053 A1 | 3/2006 | Taniguchi et al. | |
| 2006/0221385 A1 * | 10/2006 | Ohara et al. | 358/1.15 |
| 2007/0091346 A1 * | 4/2007 | Ogura et al. | 358/1.14 |

FOREIGN PATENT DOCUMENTS

| | | |
|---|---|---|
| JP | 11-134134 A | 5/1999 |
| JP | 2000-259375 A | 9/2000 |
| JP | 2000-284937 A | 10/2000 |
| JP | 2003-022172 A | 1/2003 |
| JP | 2005-173725 A | 6/2005 |
| JP | 2006-092373 A | 4/2006 |
| JP | 2006-202324 A | 8/2006 |
| JP | 2006-244263 A | 9/2006 |
| JP | 2006-268106 A | 10/2006 |

* cited by examiner

*Primary Examiner* — Benny Q Tieu
*Assistant Examiner* — Paul F Payer
(74) *Attorney, Agent, or Firm* — Sughrue Mion, PLLC

(57) ABSTRACT

A print job management system includes a job maintaining unit, a user default storing unit, a determining unit, and a job providing unit. The job maintaining unit stores a print job, ID information on an owner user of the print job, and model information on a job handling printer in association with each other, the job handling printer being a printing device corresponding to the print job. The user default storing unit stores ID information on a user and information on a user default printer in association with each other, the user default printer being a printing device selected as the job handling printer by default when a print job of the user is generated. The determining unit determines a specific printing device as the user default printer corresponding to a user and updates data stored in the user default storing unit when ID information on the user is input using an input device associated with the specific printing device. The job providing unit provides a print job stored in the job maintaining unit to a job handling printer corresponding to the print job.

13 Claims, 9 Drawing Sheets

| IDENTIFYING INFORMATION ON THIN CLIENT TERMINAL | PRINTER INFORMATION ON TERMINAL DEFAULT PRINTER (IDENTIFYING AND MODEL INFORMATION) | PRINTER INFORMATION ON AVAILABLE PRINTER (IDENTIFYING AND MODEL INFORMATION) |
|---|---|---|
| TERMINAL 10A | PRINTER 30A, MODEL X | PRINTER 30A, MODEL X |
| TERMINAL 10B | PRINTER 30C, MODEL Y | PRINTER 30B, MODEL X |
| | | PRINTER 30C, MODEL Y |

FIG. 5

| JOB ID | AUTHENTICATED PRINT JOB | ID INFORMATION ON OWNER USER | MODEL INFORMATION ON JOB HANDLING PRINTER |
|---|---|---|---|
| 1 | C : ¥0001.dat | USER S | MODEL X |
| 2 | C : ¥0002.dat | USER S | MODEL X |
| 3 | C : ¥0003.dat | USER S | MODEL Y |
| | | | |

FIG. 6A

| IDENTIFYING INFORMATION ON THIN CLIENT TERMINAL | PRINTER INFORMATION ON TERMINAL DEFAULT PRINTER (IDENTIFYING AND MODEL INFORMATION) | PRINTER INFORMATION ON AVAILABLE PRINTER (IDENTIFYING AND MODEL INFORMATION) |
|---|---|---|
| TERMINAL 10A | PRINTER 30A, MODEL X | PRINTER 30A, MODEL X |
| TERMINAL 10B | PRINTER 30C, MODEL Y | PRINTER 30B, MODEL X |
| | | PRINTER 30C, MODEL Y |
| | | |

FIG. 6B

| USER ID INFORMATION | PRINTER INFORMATION ON USER DEFAULT PRINTER (IDENTIFYING AND MODEL INFORMATION) |
|---|---|
| USER S | PRINTER 30A, MODEL X |
| USER T | PRINTER 30C, MODEL Y |
| | |

PRINT JOB MANAGEMENT SYSTEM AND DEFAULT PRINTER DETERMINING APPARATUS

BACKGROUND

1. Technical Field

The present invention relates to a technique for determining a user default printer.

2. Related Art

There is a technique for selecting a printing device that can print a job from among a plurality of available printing devices on the basis of the operational status or location of each of the plurality of available printing devices and distributing the job (see, for example, JP-A-2000-259375).

A print job typically depends on the model of a printing device. When different models of printing devices are available, it is necessary to select in advance a printing device that corresponds to the print job, that is, that can perform printing based on the print job, (hereinafter referred to as a "job handling printer").

A structure that determines a printing device selected as a job handling printer by default when a print job of a user is generated (hereinafter referred to as a "user default printer") using criteria in the technique described above in a condition that different models of printing devices are available will be discussed below.

In cases where a user default printer is determined based on the operational status of each of printing devices, even when a user wishes to use a printing device A, a printing device B may be determined as the user default printer depending on the operational status. In this case, because the print job of the user is generated so as to conform to the printing device B, the print job cannot be output from the printing device A, which is of a different model from the printing device B. This is highly inconvenient to the user, who wishes to use the printing device A.

In cases where a user default printer is determined based on the location of each of printing devices, for example, a printing device nearest to a client terminal is selected as the user default printer, a similar problem arises because a specific printing device is linked with the client terminal as a user default printer in a fixed relation thereto. For example, it is assumed that client terminals A and B are linked with different models of printing devices A and B, respectively, as a user default printer. Under these circumstances, even when a user intends to use the printing device A, a print job based on a print instruction is generated so as to conform to the printing device B as long as the print instruction is issued from the client terminal B, so the print job cannot be output from the printing device A, which is a different model from the printing device B. This is also inconvenient to the user.

In particular, in a thin client system, in which a client terminal has minimum functions and a server executes application software and file management, the above problem caused by linking a specific printing device with a client terminal as a user default printer surfaces more greatly because a user will use different client terminals at different locations.

One approach to avoiding a problem in which a user default printer differs from a printing device that a user wishes to use is to display a list of device names of available printing devices or other information at a client terminal and to enable a user to select a his/her user default printer from the list.

However, in most cases, locations and functions of printing devices are not identified from only information on device names. Therefore, even with a structure of enabling a user to select a user default printer from a list of device names, it is difficult to select an appropriate user default printer in consideration of locations and functions.

SUMMARY

An advantage of some aspects of the invention is that it provides a new framework that can appropriately and easily select a printing device that a user wishes to use as a user default printer from among different models of available printing devices.

According to a first aspect of the invention, a print job management system includes a job maintaining unit, a user default storing unit, a determining unit, and a job providing unit. The job maintaining unit stores a print job, ID information on an owner user of the print job, and model information on a job handling printer in association with each other, the job handling printer being a printing device corresponding to the print job. The user default storing unit stores ID information on a user and information on a user default printer in association with each other, the user default printer being a printing device selected as the job handling printer by default when a print job of the user is generated. The determining unit determines a specific printing device as the user default printer corresponding to a user and updates data stored in the user default storing unit when ID information on the user is input using an input device associated with the specific printing device. The job providing unit provides a print job stored in the job maintaining unit to a job handling printer corresponding to the print job.

In such a structure, when a user wishes to use a printing device, the printing device can be reliably specified as a user default printer by performance of an authentication process using an authentication device connected to the printing device. In addition, the printing device can be specified as a user default printer while the location and the functions of the printing device are physically checked. Therefore, even when different models of printing devices are available, a printing device used as a user default printer corresponding to the user can be easily selected.

Preferably, when receiving a request to transmit a print job from a printing device, the request specifying model information on the printing device and ID information on an authenticated user, the job providing unit may read a print job that matches the specified model information and ID information from the job maintaining unit and may transmit the print job to the printing device.

Preferably, the print job management system may further include a job generating unit. When receiving a print instruction from a user, the job generating unit may refer to the user default storing unit, retrieve information on a user default printer corresponding to the user, and generate a print job on the basis of the print instruction and the information on the user default printer.

Preferably, the user default storing unit, the determining unit, and the job providing unit may be implemented on a thin client server.

Preferably, the input device may include an authenticating device. The determining unit may determine the specific printing device as the user default printer corresponding to the user and update the data stored in the user default storing unit when the user is authenticated based on the ID information input using the authenticating device.

According to a second aspect of the invention, a default printer determining apparatus includes a user default storing unit and a determining unit. The user default storing unit stores ID information on a user and information on a user default printer in association with each other, the user default printer being a printing device selected as a job handling printer by default when a print job of the user is generated. The determining unit determines a specific printing device as the user default printer corresponding to a user and updates data stored in the user default storing unit when ID information on the user is input using an input device associated with the specific printing device.

According to a third aspect of the invention, a method for generating a print job includes determining a specific printing device as a user default printer, the user default printer being selected as a printing device corresponding to a print job of a user by default when the print job is generated, when ID information on the user is input using an input device associated with the specific printing device and generating a print job on the basis of information on a print instruction and information on the user default printer corresponding to a user when the print instruction is received from the user.

The method for generating a print job can be performed by a typical information processing apparatus. A program therefor can be installed or loaded via various kinds of media, such as a compact-disk read-only memory (CD-ROM), a magnetic disk, a semiconductor memory, and communication network.

In the invention, a unit indicates not only merely a physical unit but also a case in which the functions of the unit are performed by software. The functions of a single unit or apparatus may be performed by two or more physical units or apparatuses. The functions of two or more units or apparatuses may be performed by a single physical unit or apparatus.

In the invention, storing A and B in association with each other means storing A and B such that, by using at least one of A and B as a key, the other is retrievable. One example is to store A and B such that both have a direct relationship. Another example is to store A and B such that A and B have an indirect relationship by storing A and C in association with each other and storing A and B in association with each other. Still another example is to, for a structure in which A, B, and C are stored in association with each other (that is, three or more elements are stored in association with each other), store A and B in association with each other in a state where B contains C.

In the invention, examples of the printing device include, in addition to a typical printer, various printing devices having the function of performing printing based on a print job.

Therefore, the invention can provide a new framework that can easily select a printing device that a user wishes to use as a user default printer from among different models of available printing devices.

BRIEF DESCRIPTION OF THE DRAWINGS

The invention will be described with reference to the accompanying drawings, wherein like numbers reference like elements.

FIG. 5 illustrates an example data structure of a print job maintaining unit.

FIGS. 6A and 6B illustrate an example data structure of a terminal default printer storing unit and an example data structure of a user default printer storing unit, respectively.

DESCRIPTION OF EXEMPLARY EMBODIMENTS

First Embodiment

Figure 1:
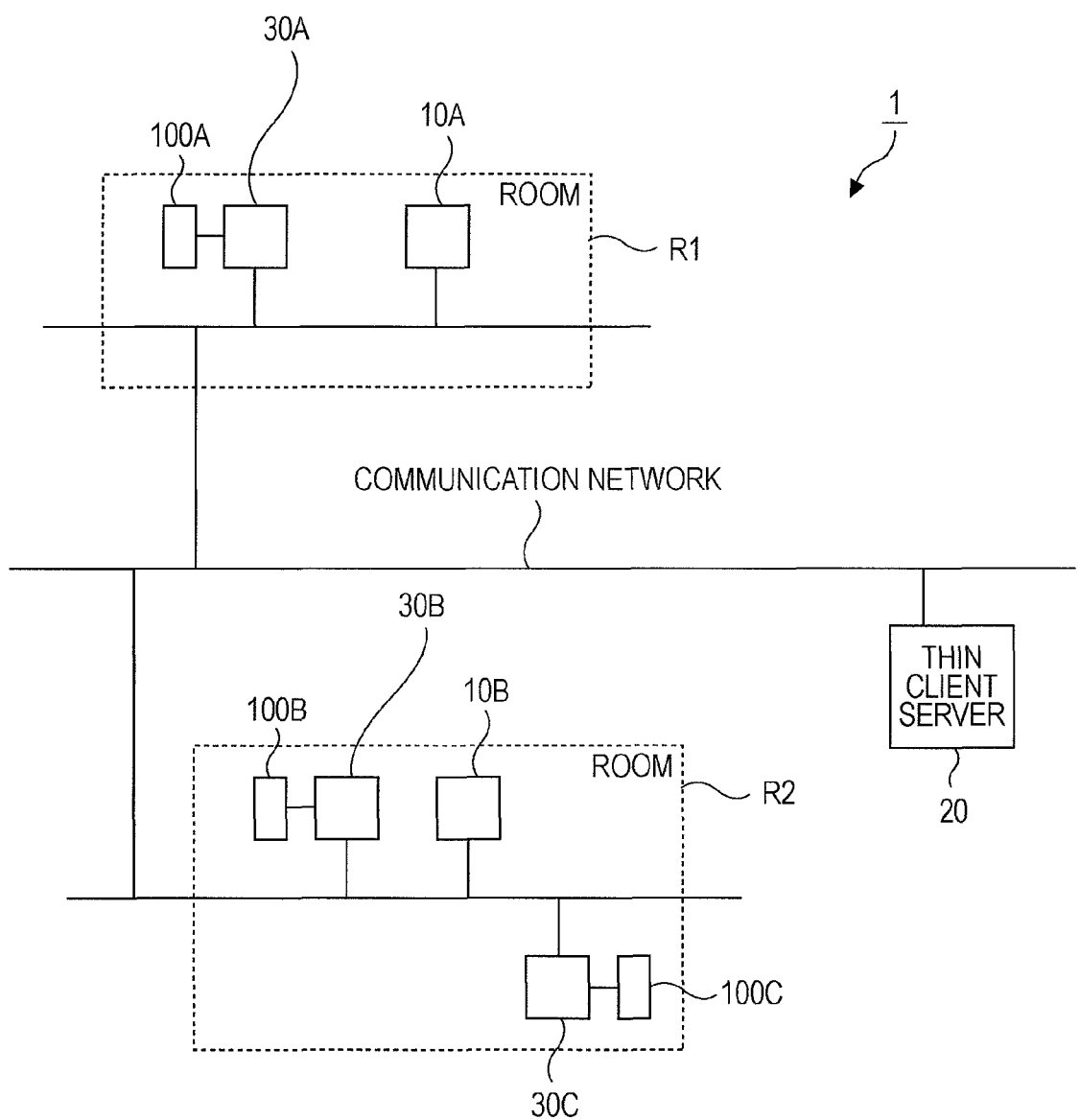
FIG. 1 is a block diagram that illustrates a schematic configuration of an authentication printing system.

FIG. 1 is a block diagram that illustrates a schematic configuration of an authentication printing system 1 according to an embodiment of the invention.

As illustrated in FIG. 1, the authentication printing system 1 includes thin client terminals 10A and 10B, a thin client server 20, printing devices 30A to 30C, and authentication devices 100A to 100C. These components constitute a thin client system that carries out management, storage, and execution of applications at a server (hereinafter referred to as a "server-based system").

The thin client terminal 10A, the printing device 30A, and the authentication device 100A are placed in a room R1. The thin client terminal 10B, the printing devices 30B and 30C, and the authentication devices 100B and 100C are placed in a room R2. The printing devices 30A and 30B are of the same model, which is different from the model of the printing device 30C.

The thin client terminals 10A and 10B, the thin client server 20, the printing devices 30A to 30C are connected to a communication network. The communication network can be a local-area network (LAN), the Internet, a dedicated line, a packet transmission network, and a combination thereof. The communication network can include both wire communication and radio communication. The printing devices 30A to 30C and the authentication devices 100A to 100C are connected to each other via a device connecting interface, such as a universal serial bus (USB).

The authentication printing system 1 illustrated in FIG. 1 includes two thin client terminals 10, one thin client server 20, and three printing devices 30. However, the authentication printing system 1 may have different numbers of these components from those in FIG. 1, depending on the design.

Hereinafter, the thin client terminals 10A and 10B are referred to as the thin client terminal 10 when a distinction between them is not necessary. The same applies to the printing devices 30A to 30C and the authentication devices 100A to 100C.

Figure 2A:
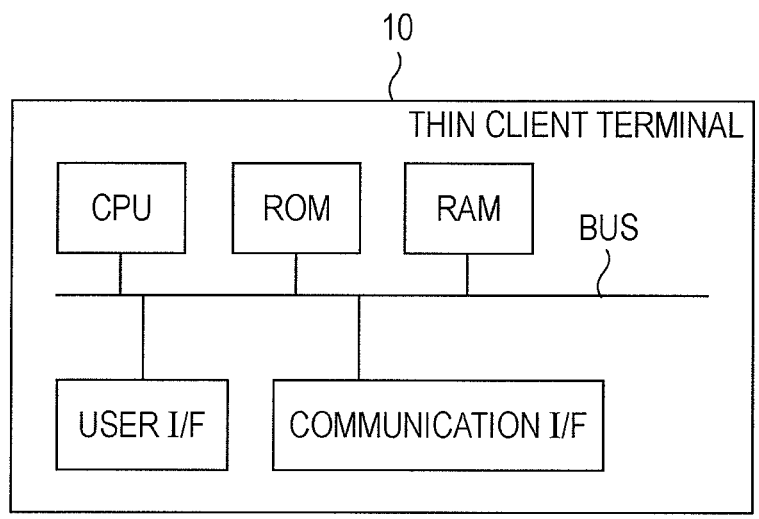
FIGS. 2A and 2B are block diagrams that illustrate a configuration of a thin client terminal.

As illustrated in FIG. 2A, the thin client terminal 10 includes hardware, such as a central processing unit (CPU), a read-only memory (ROM), a random-access memory (RAM), a user interface, a communication interface, and an ID card reader.

Figure 2B:
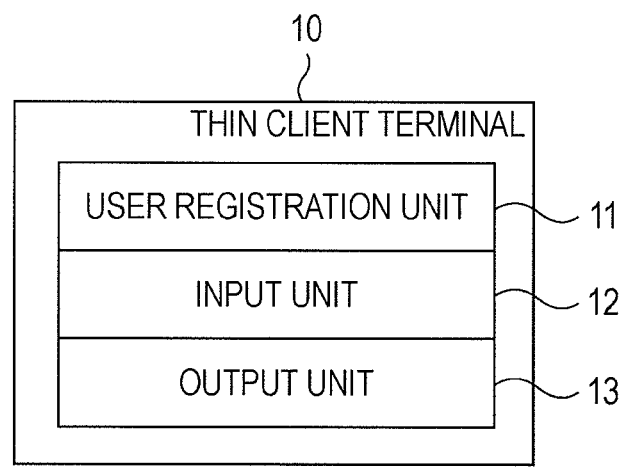

The thin client terminal 10 has similar functions to a typical thin client terminal in a server-based system. Specifically, as illustrated in FIG. 2B, the thin client terminal 10 includes a user registration unit 11 that reads ID information from an ID card of a user who uses the terminal and transmits the ID information to the thin client server 20, an input unit 12 that receives various kinds of input information from the user and transmits the information to the thin client server 20, and an output unit 13 that receives various kinds of output information from the thin client server 20 and transmits the information to the user.

These units are functionally realized by execution of a program stored in the ROM or RAM in the thin client terminal 10 by the CPU.

Figure 3A:
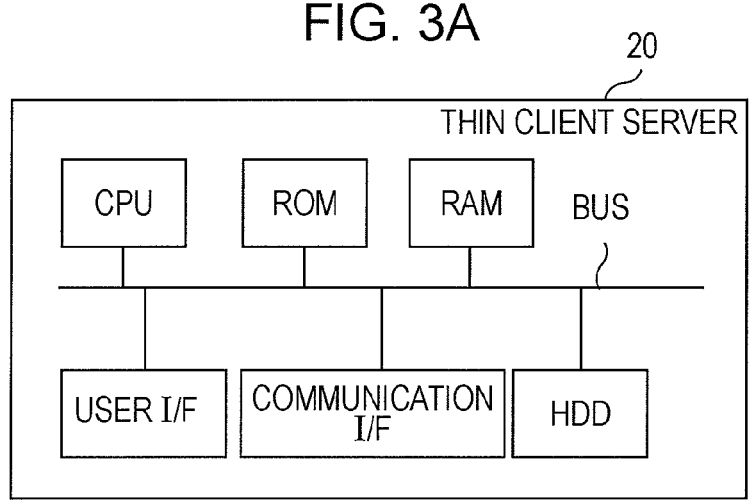
FIGS. 3A and 3B are block diagrams that illustrate a configuration of a thin client server.

As illustrated in FIG. 3A, the thin client server 20 includes hardware, such as a CPU, a ROM, a RAM, a user interface, a communication interface, and a hard disk drive (HDD).

Figure 3B:
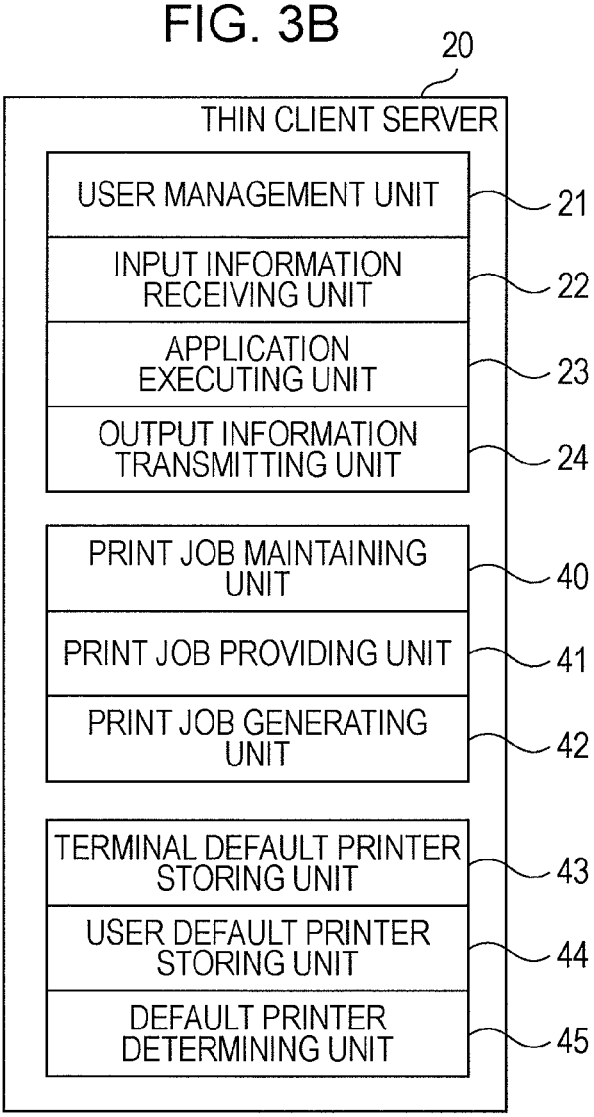

The thin client server 20 has similar functions to a typical thin client server in a server-based system. Specifically, as illustrated in FIG. 3B, the thin client server 20 includes a user management unit 21 that receives ID information on a user who uses the terminal from the thin client terminal 10, stores the ID information in association with identifying information on the thin client terminal 10 in a memory, and manages the data, an input information receiving unit 22 that receives various kinds of input information from the thin client terminal 10, an application executing unit 23 that executes various applications based on the received input information, and an output information transmitting unit 24 that transmits the result of execution of an application to the thin client terminal 10 as output information.

The thin client server 20 also has the functions as an authentication print job management system. Specifically, as illustrated in FIG. 3B, the thin client server 20 includes a print job maintaining unit 40, a print job providing unit 41, and a print job generating unit 42. The print job providing unit 41 stores an authenticated print job, ID information on an owner user (a user who instructs generation of the print job or is authorized to print the print job), and model information on the model of a job handling printer corresponding to the authorized print job in association with each other. The print job providing unit 41 reads, from the print job maintaining unit 40, an authorized print job in response to a request for the authorized print job received from the printing device 30 and transmits the authorized print job to the printing device 30. The print job generating unit 42 generates an authorized print job in response to an instruction to perform printing (a print instruction) received by the input information receiving unit 22.

FIG. 5 illustrates an example data structure of the print job maintaining unit 40. In this example, the model of a printing device is used as model information corresponding to the printing device. Information other than models may be used as long as printing devices supporting a print job can be identified using the information.

Referring back to FIG. 3B, the thin client server 20 also includes, as a function of determining a default printer, a terminal default printer storing unit 43, a user default printer storing unit 44, and a default printer determining unit 45. The terminal default printer storing unit 43 stores identifying information on the thin client terminal 10 and printer information on a printing device that is selected as a job handling printer by default when an authorized print job is generated in response to a print instruction from the thin client terminal 10 (a terminal default printer) in association with each other. The user default printer storing unit 44 stores ID information on a user and printer information on a printing device that is selected as a job handling printer by default when a print job of the user is generated (a user default printer) in association with each other. The default printer determining unit 45 automatically determines a user default printer.

FIGS. 6A and 6B illustrate an example data structure of the terminal default printer storing unit 43 and an example data structure of the user default printer storing unit 44, respectively. In the examples, the terminal default printer storing unit 43 stores printer information on printing devices available from the thin client terminal 10, in addition to the identifying information on the thin client terminal 10 and the printer information on the terminal default printer, in association with each other. In the examples, both the terminal default printer storing unit 43 and the user default printer storing unit 44 use, as the printer information, the name by which each individual printing device can be identified and the model of each individual printing device. The terminal default printer storing unit 43 and the user default printer storing unit 44 may store different kinds of printer information.

The contents of data to be stored in the terminal default printer storing unit 43 are set and the data is recorded in advance by, for example, an administrator, whereas the contents of data to be stored in the user default printer storing unit 44 are not set and the data is not recorded in the initial state and they are set and recorded by an operation of the default printer determining unit 45, which will be described below. For example, the stored data can be reset to its initial state on a regular basis (e.g., every one day or one week).

The units included in the thin client server 20 are functionally realized by execution of a program stored in a ROM or a RAM within the thin client server 20 or in an external storage medium by a CPU.

The printing device 30 has a similar structure to a typical printing device.

Figure 4A:
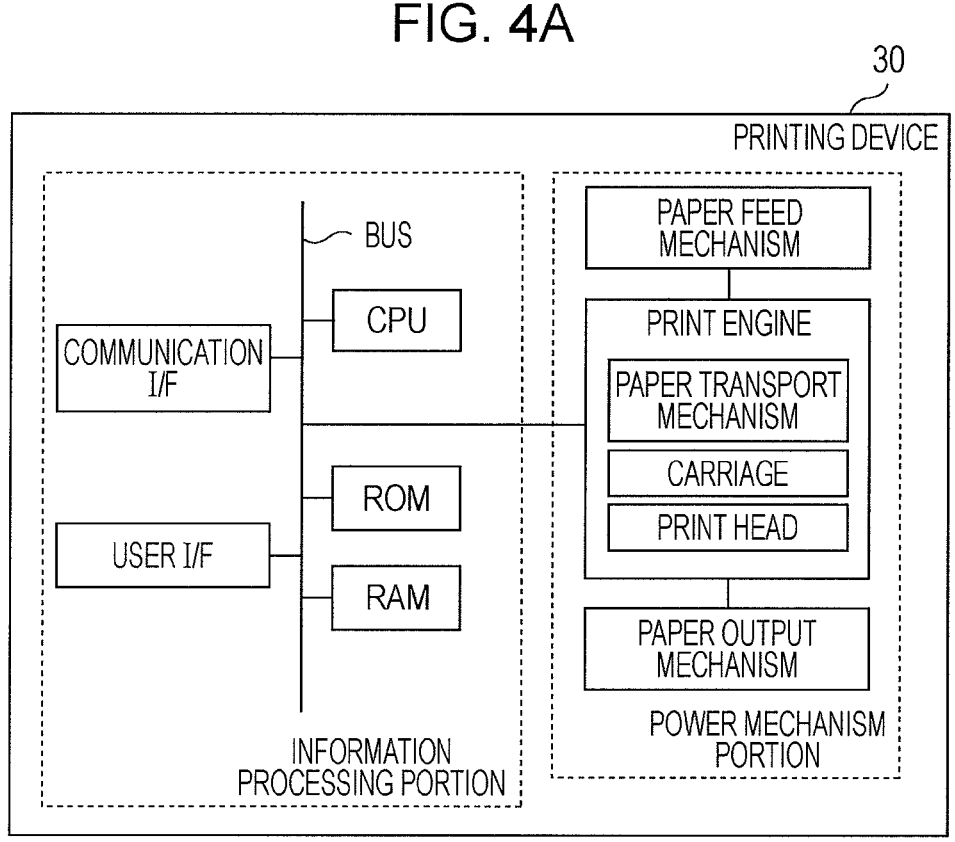
FIGS. 4A and 4B are block diagrams that illustrate a printing device.

As illustrated in FIG. 4A, the printing device 30 includes, for example, a power mechanism portion composed of a paper feed mechanism that supplies paper into the printing device, a print engine that performs printing, and an paper output mechanism that ejects paper outside the printing device. The print engine typically includes a paper transport mechanism, a carriage mechanism, and a print head. Various types of print engine corresponding to a serial printer, which performs printing character by character, such as an ink jet printer and a thermal transfer printer, to a line printer, which performs printing line by line, and to a page printer, which performs printing page by page can be used.

The printing device 30 includes, for example, an information processing portion composed of a CPU, a ROM, a RAM, a communication interface, and a user interface, such as a console panel.

Figure 4B:
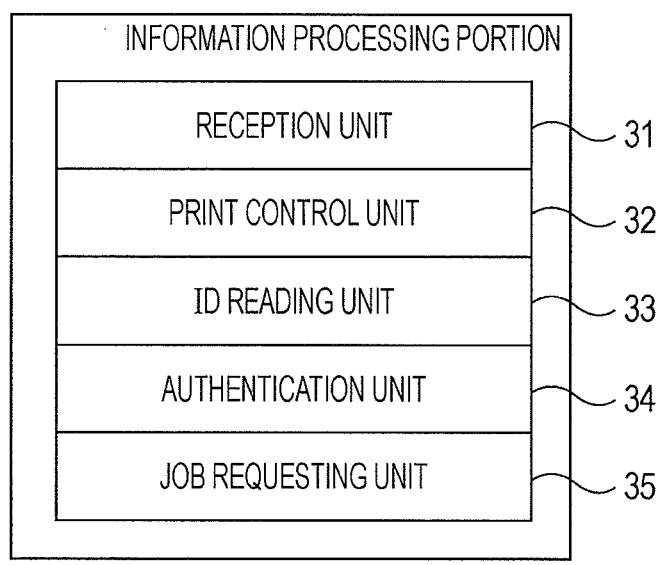

The information processing portion of the printing device 30 has similar functions to an information processing portion of a known printing device basically. As illustrated in FIG. 4B, the information processing portion includes, for example, a reception unit 31 that receives a print job and a print control unit 32 that analyzes a print job, generates a raster print image for one band or one page, stores it in an image buffer, transfers a print image for a predetermined unit (e.g., one path) from the image buffer to the print engine, and performs printing while controlling the print engine.

In addition, the information processing portion has the functions as an authentication printing device and includes, for example, an ID reading unit 33 that reads ID information from an ID card of a user who wishes to request authentication printing using the authentication device 100, an authentication unit 34 that authenticates the user on the basis of the ID information, and a job requesting unit 35 that requests an authenticated print job corresponding to the authenticated user from the thin client server (authentication print job management device) 20. An ID card can be selected from among various known forms, such as a magnetic card and an IC card, according to the structure of the authentication device 100 as long as it stores ID information (e.g., a user name, a user ID, and an employee number).

These units are functionally realized by execution of a program stored in a ROM or a RAM within the printing device 30 or in an external storage medium by a CPU.

Examples of the authentication device 100 include a magnetic card reader, a barcode reader, and a radio frequency identification (RFID) reader. Various authentication devices can be used depending on the design.

Figure 7:
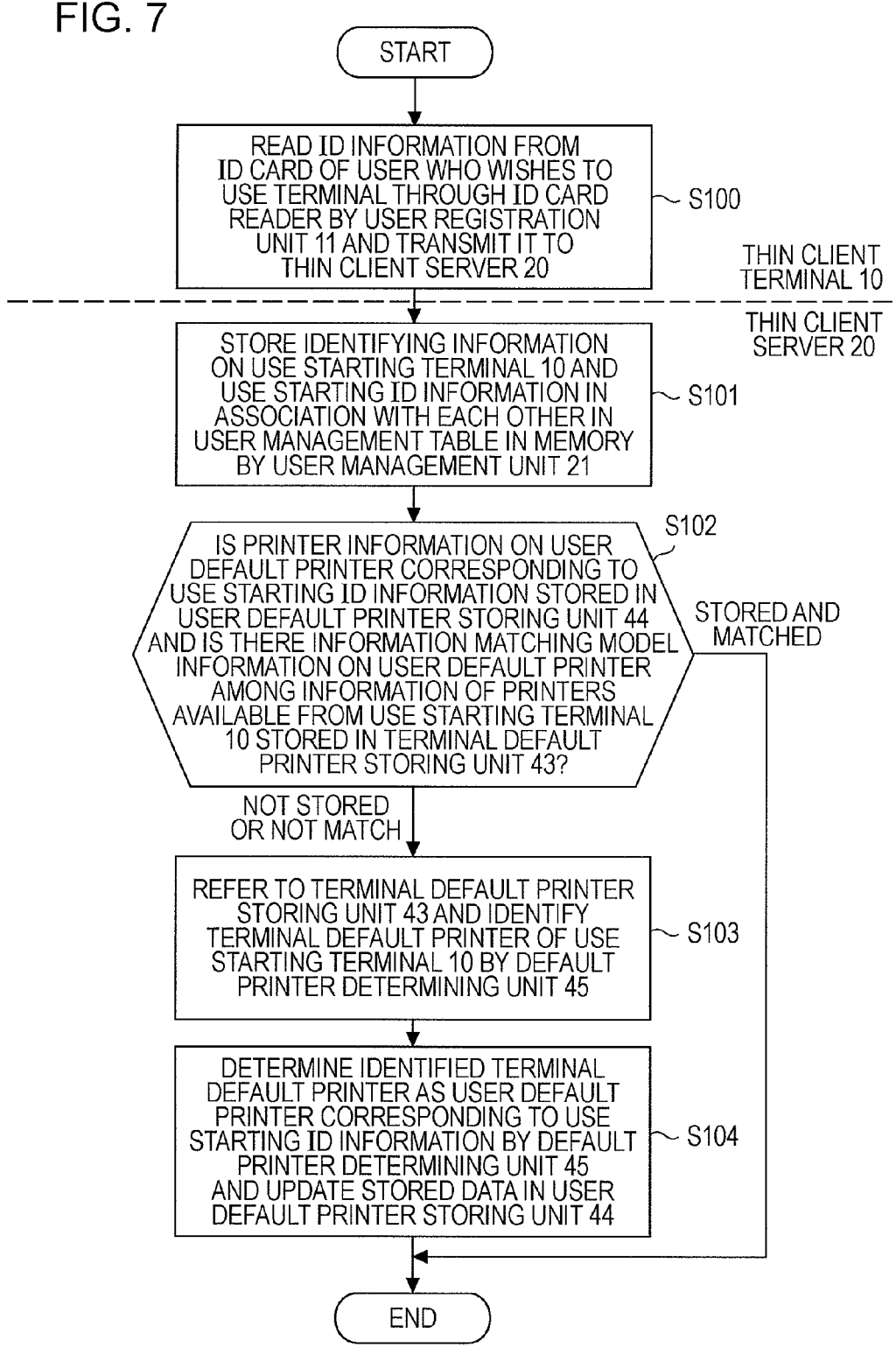
FIG. 7 is a flowchart of a process for starting the use of a terminal.

A framework of a printing process in the authentication printing system 1 will now be described below with reference to flowcharts shown in FIGS. 7 to 9. In the present specification, the sequence of steps in the flowcharts (including partial steps to which reference numerals are not assigned) can be changed or the steps can be performed in parallel as long as no contradiction arises in the contents of the process.

Process for Starting Use of Terminal: FIG. 7

When a user who wishes to use a terminal inserts an ID card into an ID card reader of the thin client terminal 10 and instructs the thin client terminal 10 to start being used, a process for starting the use of a terminal described below is executed.

The ID card reader can have various structures depending on the design. In the present embodiment, the ID card reader uses a similar system to the authentication device 100 to enable an authentication printing process using an ID card used here.

In step S100, the user registration unit 11 of the thin client terminal 10 reads ID information from an ID card of a user who wishes to use the thin client terminal 10 through an ID card reader and transfers the ID information to the thin client server 20.

In step S100, when receiving the ID information from the thin client terminal 10 (hereinafter, the received ID information is referred to as "use starting ID information" and the thin client terminal 10 that transmits the use starting ID information is referred to as a "use starting terminal 10"), the user management unit 21 of the thin client server 20 checks that it is possible to register the user who wishes to use the thin client terminal 10 by a predetermined authentication process and stores identifying information on the use starting terminal 10 and the use starting ID information in association with each other in a user management table in a memory. In this way, the user who wishes to use the thin client terminal 10 is registered as a user who uses the terminal, and after that, a similar user management process to a typical thin client system is performed by the user management unit 21.

In step S102, the default printer determining unit 45 of the thin client server 20 refers to the user default printer storing unit 44 and checks whether printer information on a user default printer corresponding to the use starting ID information is stored. When the printer information is stored, the default printer determining unit 45 refers to the terminal default printer storing unit 43 and checks whether there is information that matches model information on the user default printer among printers available from the use starting terminal 10.

In step S102, when it is determined that the printer information is not stored or when the printer information is stored and there is no information that matches the model information on the user default printer among printers available from the use starting terminal 10, flow proceeds to step S103. In step S103, the default printer determining unit 45 refers to the terminal default printer storing unit 43 and identifies a terminal default printer corresponding to the use starting terminal 10 (retrieves printer information).

In step S104, the default printer determining unit 45 determines the identified terminal default printer as a user default printer corresponding to the use starting ID information and updates data stored in the user default printer storing unit 44, that is, stores the printer information on the identified terminal default printer in association with the use starting ID information. In this way, the process for starting the use of a terminal is completed.

In step S102, when it is determined that the printer information on the user default printer corresponding to the use starting ID information is stored and there is information that matches model information on the user default printer among printers available from the use starting terminal 10, the process for starting the use of a terminal is completed without changing the data stored in the user default printer storing unit 44.

When the user default printer is determined by the default printer determining unit 45, the identifying information on the user default printer may be shown to the user who wishes to use the terminal, and the user default printer may be confirmed or changed in response to an input from the user.

When the user removes the ID card from the ID card reader of the thin client terminal 10, a process for stopping the use of a terminal is performed, as in a known technique, that is, the thin client terminal 10 transmits the ID information to the thin client server 20 and deletes information corresponding to the ID information from the user management table.

Process for Storing Authenticated Print Job: FIG. 8

When a user who uses the terminal provides a print instruction from the thin client terminal 10, a process for storing an authenticated print job described below is executed.

In step S200, when receiving a print instruction containing specification of a print target file from a user, the input unit 12 of the thin client terminal 10 transmits the print instruction to the thin client server 20.

In step S201, the input information receiving unit 22 of the thin client server 20 receives the print instruction from the thin client terminal 10 (hereinafter, this thin client terminal 10, which transmits the print instruction, is referred to as a "print instructing terminal 10"). Then, in step S202, the print job generating unit 42 refers to the user management table managed by the user management unit 21 and retrieves ID information on a user who uses the terminal corresponding to the print instructing terminal 10 (hereinafter, this retrieved ID information is referred to as "print instructing ID information").

In step S203, the print job generating unit 42 refers to the user default printer storing unit 44 and retrieves printer information on a user default printer corresponding to the print instructing ID information.

In step S204, the print job generating unit 42 generates an authenticated print job on the basis of a print target file specified by the received print instruction and the retrieved printer information on the user default printer such that the user default printer is assigned as the job handling printer (in other words, in a form interpretable by the user default printer).

The print target file specified by the print instruction is created in advance and stored in the memory of the thin client server 20.

The print job generating unit 42 can refers to a device management table that stores various kinds of information on a printing device and retrieve information necessary for generation of an authenticated print job, such as the size and type of a sheet, as in a known technique.

An authenticated print job can be generated by a typical printer driver. For example, the authenticated print job contains a job ID, model information of a job handling printer, ID information on an owner user, a document's name, and information about print settings. A user who instructs generation of a print job and a user who is authorized to print the print job may be different. A single authenticated print job may specify a plurality of users who are authorized to print the print job.

In step S205, the print job generating unit 42 stores the generated authenticated print job, the print instructing ID information, and the model information on the user default printer in association with each other in the print job maintaining unit 40. In this way, the process for storing an authenticated print job is completed.

Process for Performing Authentication Printing: FIG. 9

When a user who wishes to request authentication printing instructs authentication printing by, for example, passing an ID card through the authentication device 100 connected to the printing device 30, a process for performing authentication printing described below is performed.

In step S300, the ID reading unit 33 of the printing device 30 reads ID information from the ID card of the user who wishes to request authentication printing via the authentication device 100.

In step S301, the authentication unit 34 checks whether the user whose ID information has been retrieved is an owner user on the basis of the ID information retrieved in step S300 (performs an authentication process).

For example, when the authentication unit 34 is a client in a lightweight directory access protocol (LDAP) authentication service, a directory server (not shown) that provides the LDAP authentication service can be notified of the retrieved ID information, a result of authentication performed by the directory server in response to the notification can be received, and then, it can be determined whether the user is an owner user. Alternatively, a simple structure in which a user is authenticated by the fact that ID information is retrieved from an ID card can be used.

When the user whose ID information has been retrieved is not determined to be an owner user (NO in step S302), the process for performing authentication printing is completed.

When the user is authorized (YES in step S302), in step S303, the job requesting unit 35 generates a request for an authenticated print job such that the request contains the ID information on the authorized owner user and the model information of the printing device 30 used by the user.

When the retrieved ID information and ID information associated with the authenticated print job in the print job maintaining unit 40 are of different types, for example, when the ID information retrieved from the ID card is the employee number of the owner user and the authenticated print job is associated with the name of the owner user in the print job maintaining unit 40, the job requesting unit 35 refers to a table in which different kinds of ID information are associated with a single user in advance, retrieves ID information used in the print job maintaining unit 40, and generates a request for an authorized print job utilizing this ID information. Exchange of ID information may be performed in the thin client server 20.

In step S304, the job requesting unit 35 transmits the generated request for the authenticated print job to the thin client server 20.

In step S305, the print job providing unit 41 of the thin client server 20 receives the request for the authenticated print job from the printing device 30. Then, in step S306, the default printer determining unit 45 extracts the ID information on the authorized owner user from the received request for the authenticated print job, determines the printing device 30 that has issued the request as a user default printer corresponding to the extracted ID information on the authorized owner user, and updates the data stored in the user default printer storing unit 44, that is, stores printer information on the printing device that has issued the request in association with the extracted ID information on the authorized owner user.

Then, in step S307, the print job providing unit 41 extracts the ID information on the authorized owner user and model information on the printing device 30 that has issued the request from the received request for the authenticated print job and searches the print job maintaining unit 40 for an authenticated print job corresponding to the extracted information.

In step S308, when the corresponding authenticated print job is found by searching, the print job providing unit 41 reads the print job and transmits it to the printing device 30 that has issued the request.

A list of information on the corresponding authenticated print job may be generated and transmitted to the printing device 30, and a user may select an authenticated print job that the user wishes to print from the list. It is preferable that the authenticated print job whose transmission to the printing device 30 has been completed be deleted from the print job maintaining unit 40 at a predetermined timing, for example, when a notification that printing has finished is received from the printing device 30 or after a predetermined period of time has elapsed from the end of the transmission.

In step S309, the reception unit 31 of the printing device 30 receives the authenticated print job from the thin client server 20. In step S310, the print control unit 32 performs printing based on the authenticated print job, as in a known technique. That is, the print control unit 32 analyzes the authenticated print job, generates a raster print image for one band or one page, stores it in an image buffer, transfers a print image for a predetermined unit (e.g., one path) from the image buffer to the print engine in accordance with a control command in the authenticated print job, and performs printing while controlling the print engine. When printing is completed, the process for performing authentication printing is completed.

EXAMPLES

A case will be described below in which, assuming that the data stored in the terminal default printer storing unit 43 is shown in FIG. 6A and the data stored in the user default printer storing unit 44 is in the initial state, a user S provides a print instruction M from the thin client terminal 10A, then performs authentication printing by the printing device 30B, which the user S intends to use by default, and then provides a print instruction N from the thin client terminal 10B.

(1) First, the user S inserts an ID card into a ID card reader of the thin client terminal 10A to start the use of the thin client terminal 10A. This starts the process for starting the use of a terminal, as shown in FIG. 7, and in step S101, the user S is registered as a user who uses the thin client terminal 10A.

In this stage, printer information on a user default printer for the user S is not stored in the user default printer storing unit 44. Therefore, as a result of the determination in step S102, steps S103 and S104 are performed.

More specifically, the default printer determining unit 45 refers to the terminal default printer storing unit 43, identifies the printing device 30A corresponding to the thin client terminal 10A, determines the printing device 30A as the user default printer for the user S, and updates the data stored in the user default printer storing unit 44, that is, stores printer information on the printing device 30A in association with ID information on the user S. In this way, the process for starting the use of the thin client terminal 10A is completed.

Figure 8:
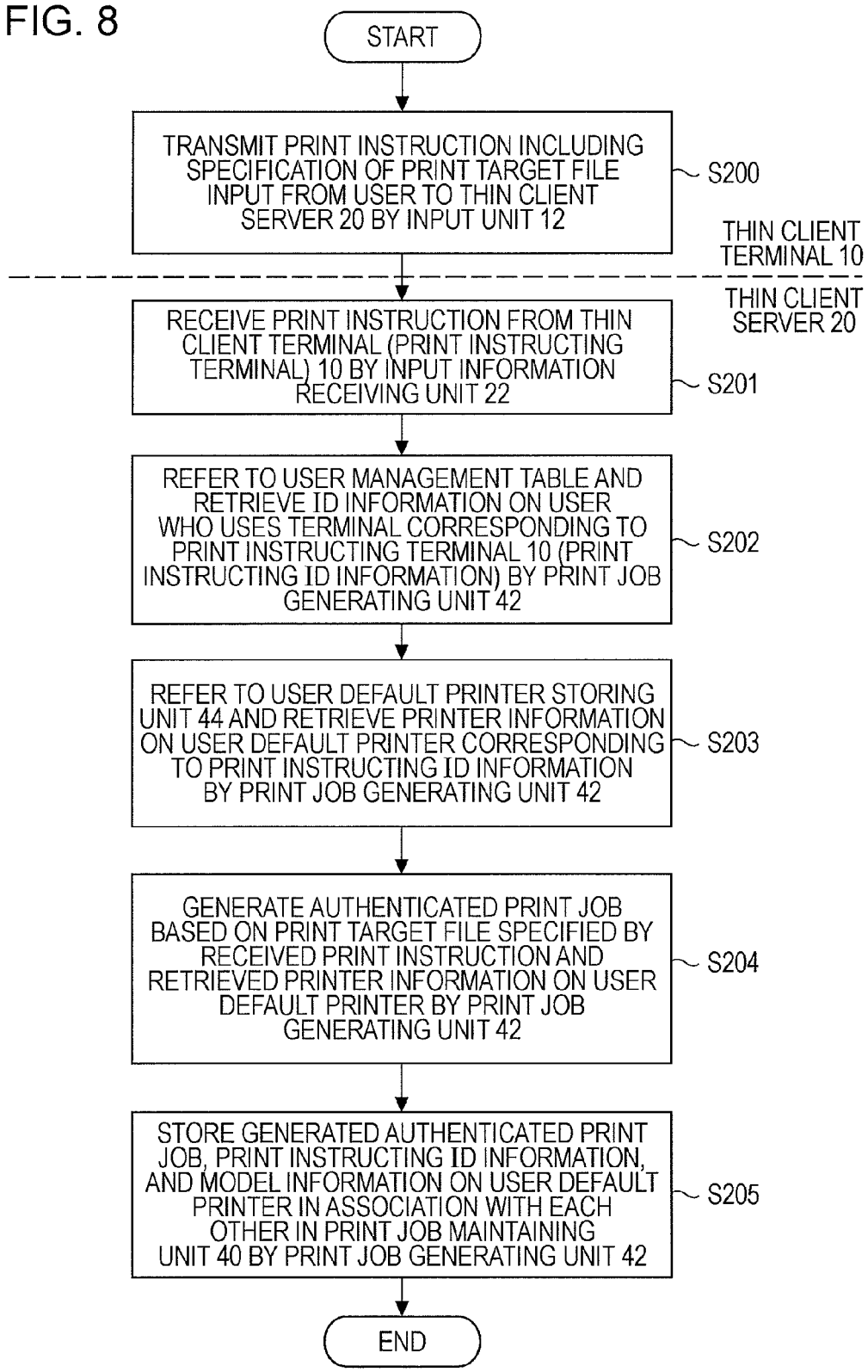
FIG. 8 is a flowchart of a process for storing an authenticated print job.

(2) Subsequently, when the user S inputs the print instruction M from the thin client terminal 10A, the process for storing an authenticated print job, as shown in FIG. 8, is performed.

In step S203 in this process, the print job generating unit 42 refers to the user default printer storing unit 44 and retrieves printer information on the printing device 30A corresponding to the user S.

Then, the print job generating unit 42 generates an authenticated print job M' on the basis of a print target file specified by the print instruction M and the retrieved printer information on the user default printer 30A such that the user default printer 30A is assigned as the job handling printer (in other words, in a form interpretable by the user default printer 30A).

Then, the generated authenticated print job M' is stored in the print job maintaining unit 40 in association with ID information on an owner user of the authenticated print job M' (i.e., ID information on the user S) and model information on the job handling printer corresponding to the authenticated print job M' (i.e., "Model X" indicated in the model information on the user default printer 30A). In this way, the process for storing an authenticated print job in response to the print instruction M is completed.

(3) Then, the user S removes the ID card from the ID card reader of the thin client terminal 11A and stops the use thereof. After that, the user S moves from the room R1 to the room R2 and passes the ID card through the authentication device 100B connected to the printing device 30B.

Figure 9:
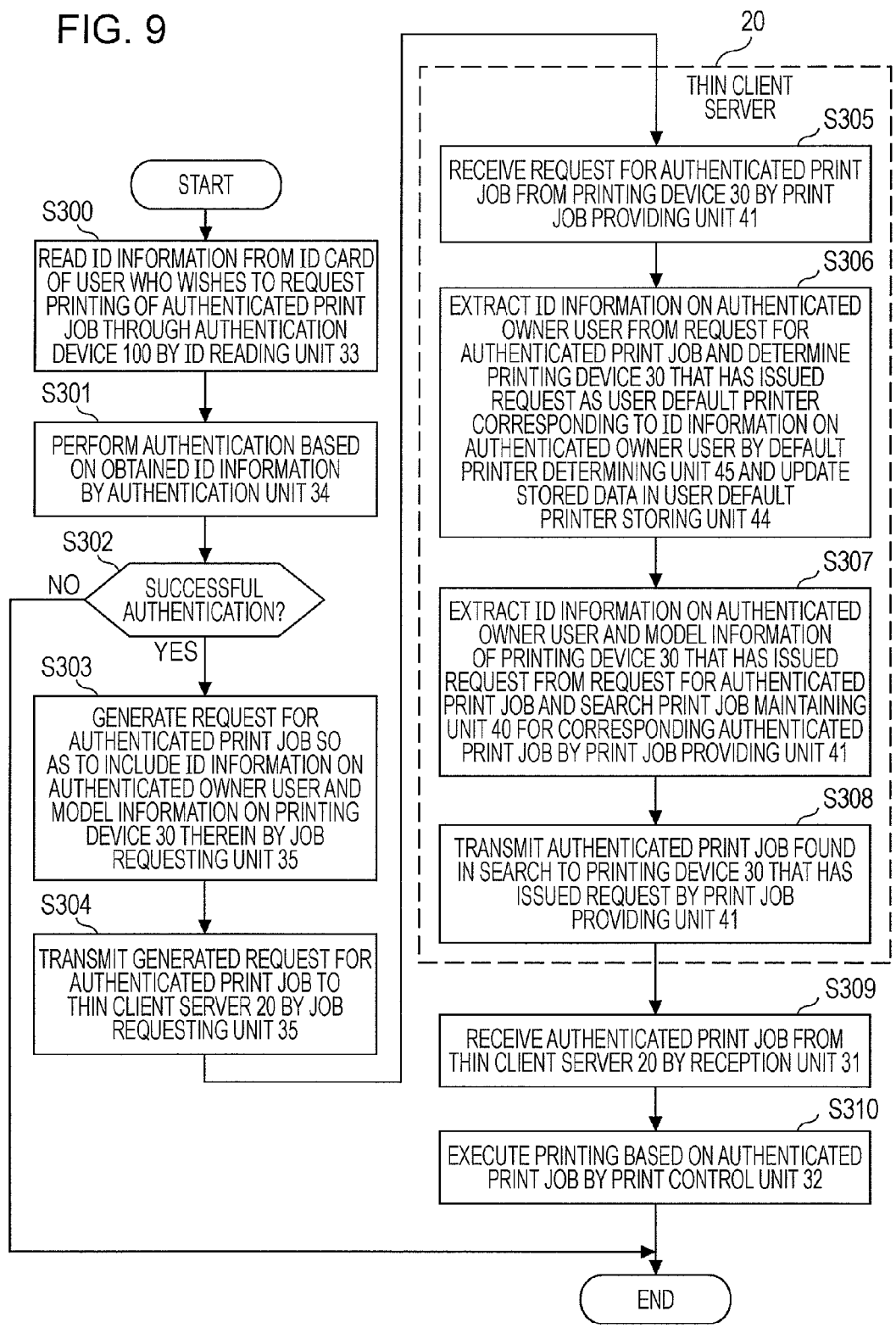
FIG. 9 is a flowchart of a process for performing authentication printing.

In response to this, the process for performing authentication printing, as shown in FIG. 9, is performed. A request for an authenticated print job, the request containing the ID information on the user S and the printer information on the printing device 30B, is transmitted from the printing device 30B to the thin client server 20.

When the print job providing unit 41 receives the request for the authenticated print job from the printing device 30B, the default printer determining unit 45 determines the printing device 30B as the user default printer corresponding to the user S and updates the data stored in the user default printer storing unit 44, that is, stores the printer information on the printing device 30B in synchronization with the ID information on the user S.

The print job providing unit 41 searches for an authenticated print job corresponding to the ID information on the user S and the model information "Model X" on the printing device 30B contained in the request for the authenticated print job. In this example, the authenticated print job M' is found by this search and transmitted to the printing device 30B. As a result, the printing device 30B performs printing based on the authenticated print job M'.

(4) Then, the user S inserts the ID card into the ID card reader of the thin client terminal 10B. This starts the process for starting the use of a terminal, as shown in FIG. 7, and in step S101, the user S is registered as a user who uses the thin client terminal 10B.

In this stage, the printer information on the user default printer corresponding to the user S is stored in the user default printer storing unit 44. Therefore, the process for starting the use of a terminal is completed without changing the stored data.

(5) Subsequently, when the user S inputs a print instruction N from the thin client terminal 10B, the process for storing an authenticated print job, as shown in FIG. 8, is performed.

In step S203 in this process, the print job generating unit 42 refers to the user default printer storing unit 44 and retrieves printer information on the printing device 30B corresponding to the user S.

Then, the print job generating unit 42 generates an authenticated print job N' on the basis of a print target file specified by the print instruction N and the retrieved printer information on the user default printer 30B such that the user default printer 30B is assigned as the job handling printer (in other words, in a form interpretable by the user default printer 30B).

Then, the generated authenticated print job N' is stored in the print job maintaining unit 40 in association with ID information on an owner user of the authenticated print job N' (i.e., ID information on the user S) and model information on the job handling printer for the authenticated print job N' (i.e., "Model X" indicated in the model information on the user default printer 30B). In this way, the process for storing an authenticated print job in response to the print instruction N is completed.

In a case described in the above example, if a structure in which a user default printer is determined based on the operational status of the printing device 30 is employed, as in a known technique, there is a possibility that the authenticated print job N' is not output from the printing device 30B, which the user S wishes to use, because the authenticated print job N' based on the print instruction N may be generated based on information other than the printer information on the printing device 30B.

If a structure in which the thin client terminal 10 is linked with a specific printing device as a user default printer is employed, as in a known technique, the authenticated print job is not output from the printing device 30B, which the user S wishes to use, because the authenticated print job N' based on the print instruction N is generated based on printer information.

In contrast to this, in the present embodiment, a structure is employed in which, when a user is authenticated using the authentication device 100 associated with a specific printing device 30, the specific printing device 30 is determined as a user default printer.

According to this structure, when a user wishes to use the printing device 30B, for example, the printing device 30B can be reliably specified as a user default printer by performance of authentication printing using the authentication device 100B connected to the printing device 30B. Therefore, an authenticated print job generated subsequently thereto can be output from the printing device 30B. Because the printing device 30B is specified as a user default printer while the location and the functions of the printing device 30B are physically checked, even if different models of printing devices are available, a printing device used as a user default printer corresponding to the user can be selected easily.

Modifications

The invention is not limited to the embodiment and examples described above, and various modifications are applicable.

For example, in the above-described embodiment, the thin client server 20 has the functions as an authentication print job management system. However, the thin client server 20 and the authentication print job management system may be provided as different forms. Similarly, the default printer determining unit 45 included in the thin client server 20 may be provided as a default printer determining device separated from other functions. The thin client terminal 10 and/or the printing device 30 may have the functions of the authentication print job management system in part or in entirety (for example, the print job maintaining unit 40).

In the above-described embodiment, the invention is applied to the authentication printing system. However, the invention is also applicable to a print system other than the authentication print system. For example, similar advantages can be obtained when the invention is applied to a typical print system that performs printing in the sequence of spooling of print jobs or to a print system that performs printing when a predetermined condition (e.g., whether an authorized user corresponding to a print job is present in a predetermined area) is satisfied. When the invention is applied to a typical print system, the print job providing unit provides a print job stored in a job maintaining unit to a job handling printer corresponding to the print job (to one of printing devices matching the print job).

In the above-described embodiment, the printing device 30 is connected to the authentication device 100. However, if a structure in which an authentication process is not necessary is employed, the printing device 30 may be connected to and associated with a typical input device (e.g., touch panel or button) instead of the authentication device 100. For such a structure, an input interface included in the printing device 30 itself may be used as the input device. When such a structure is employed, the user default printer storing unit 44 updates the data stored in the user default printer storing unit 44 when user ID information is input using an input device connected to and associated with the printing device 30.

In the above-described embodiment, the invention is applied to a print system premised on a server-based thin-client system, and thus the thin client server 20 includes a print job generating unit. However, the invention is also applicable to a print system that is not premised on a server-based thin-client system. When a print system is not premised on a server-based thin-client system, a printer driver implemented on each of the terminals 10 retrieves printer information on a user default printer by inquiring of the server 20 and generates a print job based on the information. Each terminal 10 may include the user default printer storing unit 44 and/or the default printer determining unit 45. In this case, the terminal 10 can generate a print job without inquiring of the thin client server 20.

In the above-described embodiment, the terminal default printer storing unit 43 stores the identifying information on the thin client terminal 10 and the printer information on the terminal default printer in association with each other. However, the invention is not limited to this structure. For example, by storing the identifying information on the thin client terminal 10 and identifying information on a room where the thin client terminal 10 is placed in association with each other and storing identifying information on each room and printer information on a printing device that is selected as a job handling printer by default when a print job is generated in response to a print instruction from a terminal placed in the room (room default printer) in association with each other, the thin client terminal 10 may be indirectly associated with a terminal default printer (specifically, a room default printer corresponding to a room where the thin client terminal 10 is placed).

In the above-described embodiment, the print job maintaining unit 40 stores an authenticated print job, ID information, and model information on a job handling printer in direct association with each other. However, if an authenticated print job contains model information on a job handling printer, the authenticated print job and the ID information may be stored in association with each other, and the model information on the job handling printer may be extracted from the authenticated print job and referred to.

In the above-described embodiment, the print job generating unit 42 automatically refers to printer information on a user default printer and generates a print job. However, the printer information on the user default printer may be shown to a user before the print job is generated, and the user may confirm or change the job handling printer.

In the above-described embodiment, in the process for performing authentication printing, the data stored in the user default printer storing unit 44 is updated based on ID information and identifying information on a printing device contained in a request for an authenticated print job. However, only registration of a user default printer may be carried out without the process for performing authentication printing. For example, when authentication printing is executed using the authentication device 100 connected to the printing device 30 or when ID information on a user is input using an input device associated with the printing device 30, the printing device 30 may transmit a request to register a default printer, the request containing the ID information on the authorized user and identifying information on the printing device 30, to the thin client server 20, and the thin client server 20 may update the data stored in the user default printer storing unit 44 on the basis of the ID information and the identifying information on the printing device contained in the request to register the default printer.

In the above-described embodiment, when no user default printer is registered in the user default printer storing unit 44, a terminal default printer is determined as the user default printer. However, the user default printer may be determined based on the operational status of each of the printing devices 30.

In the above-described embodiment, when a request for an authenticated print job is received from the printing device 30, the data stored in the user default printer storing unit 44 is always updated. However, the invention is not limited to this structure. For example, when a request for an authenticated print job is received, it may be determined whether an authenticated print job corresponding to ID information contained in the request is stored in the print job maintaining unit 40, and, only when the authenticated print job is stored and model information on a job handling printer corresponding to the stored authenticated print job matches model information contained in the user default printer storing unit 44, the data stored in the user default printer storing unit 44 may be updated. According to this structure, a user default printer can be determined so as to match an authenticated print job stored in the print job maintaining unit 40.

In the above-described embodiment, information necessary for generation of an authenticated print job is obtained by reference to a device management table that stores various kinds of information on printing devices on the basis of printer information stored in the user default printer storing unit 44. However, an authenticated print job may be generated by reference to information necessary for generation of an authenticated print job directly stored in the user default printer storing unit 44.

The entire disclosure of Japanese Patent Application No. 2007-042745, filed Feb. 22, 2007 is expressly incorporated by reference herein.

What is claimed is:

1. A print job management system comprising:
  a job maintaining unit that stores a print job, ID information on an owner user of the print job, and model information on a job handling printer in association with each other, the job handling printer being a printing device corresponding to the print job;
  a user default storing unit that stores ID information on a user and information on a user default printer, including printer model information, in association with each other, the user default printer being a printing device selected as the job handling printer by default based on the printer model information when a print job of the user is generated;
  a determining unit that determines a specific printing device as the user default printer corresponding to a user and updates data stored in the user default storing unit by storing printer information on the specific printing device, including the specific printer's model information, in association with ID information, when ID information on the user is input using an input device associated with the specific printing device; and a job providing unit that provides a print job stored in the job maintaining unit to a job handling printer corresponding to the print job.

2. The print job management system according to claim 1, wherein, when receiving a request to transmit a print job from a printing device, the request specifying model information on the printing device and ID information on an authenticated user, the job providing unit reads a print job that matches the specified model information and ID information from the job maintaining unit and transmits the print job to the printing device.

3. The print job management system according to claim 1, further comprising:

a job generating unit that, when receiving a print instruction from a user, refers to the user default storing unit, retrieves information on a user default printer corresponding to the user, and generates a print job on the basis of the print instruction and the information on the user default printer.

4. The print job management system according to claim 3, wherein the user default storing unit, the determining unit, and the job providing unit are implemented on a thin client server.

5. The print job management system according to claim 1, wherein the input device includes an authenticating device, and the determining unit determines the specific printing device as the user default printer corresponding to the user and updates the data stored in the user default storing unit when the user is authenticated based on the ID information input using the authenticating device.

6. The print job management system according to claim 1, wherein the determining unit checks whether printer information on a default printer corresponding to the ID information on the user is stored in the user default storing unit.

7. The print job management system according to claim 6, wherein if the printer information is not stored in the user default storing unit, the determining unit checks a terminal default printer storing unit and identifies a terminal default printer corresponding to a user terminal used by the user.

8. A default printer determining apparatus comprising:

a user default storing unit that stores ID information on a user and information on a user default printer, including printer model information, in association with each other, the user default printer being a printer device selected as a job handling printer by default based on the printer model information when a print job of the user is generated; and a determining unit that determines a specific printing device as the user default printer corresponding to a user and updates data stored in the user default storing unit by storing printer information on the specific printing device, including the specific printer'sprinter model information, in association with ID information, when ID information on the user is input using an input device associated with the specific printing device.

9. The default printer determining apparatus according to claim 8, wherein the determining unit checks whether printer information on a default printer corresponding to the ID information on the user is stored in the user default storing unit.

10. The default printer determining apparatus according to claim 9, wherein if the printer information is not stored in the user default storing unit, the determining unit checks a terminal default printer storing unit and identifies a terminal default printer corresponding to a user terminal used by the user.

11. A method for generating a print job, the method comprising:

determining a specific printing device as a user default printer, the user default printer being selected as a printing device corresponding to a print job of a user by default based on printer model information when the print job is generated, when ID information on the user is input using an input device associated with the specific printing device;

storing printer information on the specific printing device, including printer model information, in association with the ID information; and generating a print job on the basis of information on a print instruction and information on the printer model information of the user default printer when the print instruction is received from the user.

12. The method for generating a print job according to claim 11, further comprises checking whether printer information on a default printer corresponding to the ID information on the user is stored in a user default storing unit.

13. The method for generating a print job according to claim 12, further comprising:

if the printer information is not stored in the user default storing unit, checking a terminal default printer storing unit and identifying a terminal default printer corresponding to a user terminal used by the user.

* * * * *